(12) United States Patent
Mohammed-Fakir et al.

(10) Patent No.: US 6,641,144 B2
(45) Date of Patent: *Nov. 4, 2003

(54) SUPPLEMENTAL SEAL FOR THE CHORDAL HINGE SEALS IN A GAS TURBINE

(75) Inventors: Abdul-Azeez Mohammed-Fakir, Schenectady, NY (US); Mahmut Faruk Aksit, Istanbul (TR); Ahmad Safi, Troy, NY (US); Srikanth Vedantam, Niskayuna, NY (US); Ning Fang, West Chester, OH (US)

(73) Assignee: General Electric Company, Schenectady, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 10/028,924

(22) Filed: Dec. 28, 2001

(65) Prior Publication Data

US 2003/0122320 A1 Jul. 3, 2003

(51) Int. Cl.⁷ .................................. F01D 9/04
(52) U.S. Cl. ................. 277/637; 277/650; 415/191; 415/209.2; 415/209.3
(58) Field of Search ................. 277/355, 416, 277/543, 545, 559, 637, 641, 650; 415/174.2, 174.3, 189, 191, 209.2, 209.3

(56) References Cited

U.S. PATENT DOCUMENTS

| | | | | |
|---|---|---|---|---|
| 2,609,176 A | * | 9/1952 | Purvis | 415/138 |
| 4,184,689 A | | 1/1980 | Brodell et al. | |
| 4,314,793 A | * | 2/1982 | DeTolla et al. | 415/135 |
| 4,645,217 A | * | 2/1987 | Honeycutt et al. | 277/555 |
| 4,815,933 A | | 3/1989 | Hansel et al. | |
| 5,118,120 A | * | 6/1992 | Drerup et al. | 277/628 |
| 5,143,292 A | * | 9/1992 | Corsmeier et al. | 239/127.3 |
| 5,149,250 A | | 9/1992 | Plemmons et al. | |
| 5,271,714 A | | 12/1993 | Shepherd et al. | |
| 5,372,476 A | | 12/1994 | Hemmelgarn et al. | |
| 5,509,669 A | * | 4/1996 | Wolfe et al. | 277/654 |
| 5,645,398 A | * | 7/1997 | Benoist et al. | 415/134 |
| 5,653,580 A | * | 8/1997 | Faulder et al. | 415/209.3 |
| 5,797,723 A | * | 8/1998 | Frost et al. | 415/174.2 |
| 6,076,835 A | * | 6/2000 | Ress et al. | 277/637 |
| 6,095,750 A | | 8/2000 | Ross et al. | |
| 6,435,820 B1 | * | 8/2002 | Overberg | 415/138 |
| 6,464,232 B1 | * | 10/2002 | Marchi et al. | 277/630 |
| 6,572,331 B1 | * | 6/2003 | Mohammed-Fakier et al. | 415/191 |

* cited by examiner

Primary Examiner—Anthony Knight
Assistant Examiner—Alison K. Pickard
(74) Attorney, Agent, or Firm—Nixon & Vanderhye

(57) ABSTRACT

In a gas turbine having a chordal hinge seal between an inner rail of each nozzle segment and an annular axially facing sealing surface of a nozzle support ring, a flexible supplemental seal is disposed between the support ring and inner band of the nozzle segment radially inwardly of the chordal hinge seal. To minimize or prevent leakage flow across the chordal hinge seal, the flexible seal extends between the inner rail and the sealing surface of the support ring radially inwardly of the chordal hinge seal. A first margin of the flexible seal engages in a linear groove carried by the inner rail. The opposite margin extends arcuately in sealing engagement with the nozzle support ring.

21 Claims, 8 Drawing Sheets

SUPPLEMENTAL SEAL FOR THE CHORDAL HINGE SEALS IN A GAS TURBINE

BACKGROUND OF THE INVENTION

The present invention relates to seals in a gas turbine for supplementing the chordal hinge seals between turbine nozzles and a turbine nozzle support ring and particularly relates to supplementary seals for substantially minimizing or eliminating leakage losses past the chordal hinge seals.

In a gas turbine, hot gases of combustion flow from combustors through first-stage nozzles and buckets and through the nozzles and buckets of follow-on turbine stages. The first-stage nozzles typically include an annular array or assemblage of cast nozzle segments each containing one or more nozzle stator vanes per segment. Each first-stage nozzle segment also includes inner and outer band portions spaced radially from one another. Upon assembly of the nozzle segments, the stator vanes are circumferentially spaced from one another to form an annular array thereof between annular inner and outer bands. A nozzle retaining ring coupled to the outer band of the first-stage nozzles supports the first-stage nozzles in the gas flow path of the turbine. An annular nozzle support ring, preferably split at a horizontal midline, is engaged by the inner band and supports the first-stage nozzles against axial movement.

In an exemplary arrangement, eighteen cast segments are provided with two vanes per segment. The annular array of segments are sealed one to the other along adjoining circumferential edges by side seals. The side seals seal between a high pressure region radially inwardly of the inner band, i.e., compressor discharge air at high pressure, and the hot gases of combustion in the hot gas flow path which are at a lower pressure.

Chordal hinge seals are used to seal between the inner band of the first-stage nozzles and an axially facing surface of the nozzle support ring. Each chordal hinge seal includes an axial projection which extends linearly along a chord line of the inner band portion of each nozzle segment. Particularly, the chordal hinge seal extends along an inner rail of each segment and which rail extends radially inwardly of the inner band portion. The chordal hinge seal projection lies in sealing engagement with the axially opposite facing sealing surface of the nozzle support ring.

During operation and/or repair of the first-stage nozzle, it has been found that warpage can leave gaps between the chordal hinge seals and the sealing surface of the nozzle support ring. These gaps enable leakage past the chordal hinge seals from the high pressure area radially within the annular inner band into the hot gas flow path. That is, the chordal hinge seals are inadequate to prevent leakage flow as the chordal hinge seal projections lose contact with the sealing surface of the nozzle support ring. Consequently, there is a need for a supplemental seal at the interface of the first-stage nozzles and nozzle support ring to minimize or eliminate the leakage flow past the chordal hinge seals.

BRIEF DESCRIPTION OF THE INVENTION

In accordance with a preferred embodiment of the present invention, there is provided a supplemental seal between the first-stage nozzles and the nozzle support ring which eliminates or minimizes leakage past the chordal hinge seals. The supplemental seal includes a flexible, preferably sheet metal seal secured between the inner rail of each nozzle segment and the sealing surface of the nozzle support ring on the high pressure side of the chordal hinge seal. Particularly, the supplemental seal has a first margin which is sealingly engaged in a groove formed along an inner chordal surface of the inner rail and a second margin which has an arcuate configuration projecting axially toward and for sealing engagement against the sealing surface of the nozzle support ring. The first margin of the supplemental seal received in the groove is bent or folded to bear in sealing engagement against a surface, preferably the base of the groove to preclude leakage past the seal at the groove. To retain the margin of the supplemental sheet metal seal in the groove, an elongated strip is secured to the flexible seal linearly along its first margin. The groove has a flange and the strip includes an opposing, overlapping flange which retains the flexible seal against radial dislocation from the groove. Preferably, a second elongated strip is provided along the opposite side of the first margin from the first strip to locate the edge of the strip centrally within the groove of the inner rail.

The second or opposite margin of the supplemental seal includes an edge which bears against the sealing surface of the nozzle support ring. The second margin is arcuate about the axis of the rotor. The supplemental seal thus seals directly between the high pressure region and regions radially outwardly of the supplemental seal, including the chordal hinge seal. Thus, leakage flow past the chordal hinge seal is minimized or eliminated as a result of the sealing margins of the supplemental seal against the inner rail and the nozzle support ring. Preferably, the supplemental seal has a linear first margin such that the first margin can be disposed along a chord line within the groove along the inner surface of the inner rail. The opposite edges of the supplemental seal may overlap with one another to form intersegment seals.

In a preferred embodiment according to the present invention, there is provided a turbine comprising a turbine nozzle support ring having a generally axially facing first surface, a turbine nozzle segment having at least one stator vane and including an inner band carrying an inner rail, the inner rail having a second surface in axial opposition to the first surface, one of the first and second surfaces including an axially extending projection therealong for engagement with another of the first and second surfaces to form a first seal therebetween sealing between high and low pressure regions on opposite sides of the seal and a flexible supplemental seal extending between the inner rail and the first surface at a location radially inwardly of the first seal and between at least opposite end edges of the segment, a first margin of the flexible seal being secured to the inner rail and a second margin of the flexible seal sealingly engageable with the first surface.

In a further preferred embodiment according to the present invention, there is provided a gas turbine comprising a turbine nozzle support ring having a generally axially facing first surface, a plurality of turbine nozzle segments each having at least one stator vane and an inner rail, the inner rails of the segments forming a generally annular second surface in axial opposition to the first surface, each of the segments including an axially extending projection along the second surface thereof for engagement with the first surface to form a first seal therebetween sealing between high and low pressure regions on opposite sides of the seal, a plurality of flexible supplemental seal segments extending between the inner rails and the first surface at locations radially inwardly of the first seal, each flexible seal segment having a first margin secured to the inner rails of at least two adjoining segments and spanning at least the joint therebetween, a second margin of each flexible seal segment sealingly engageable with the first surface in response to leakage flow past the first seal.

DETAILED DESCRIPTION OF THE INVENTION

Figure 1:
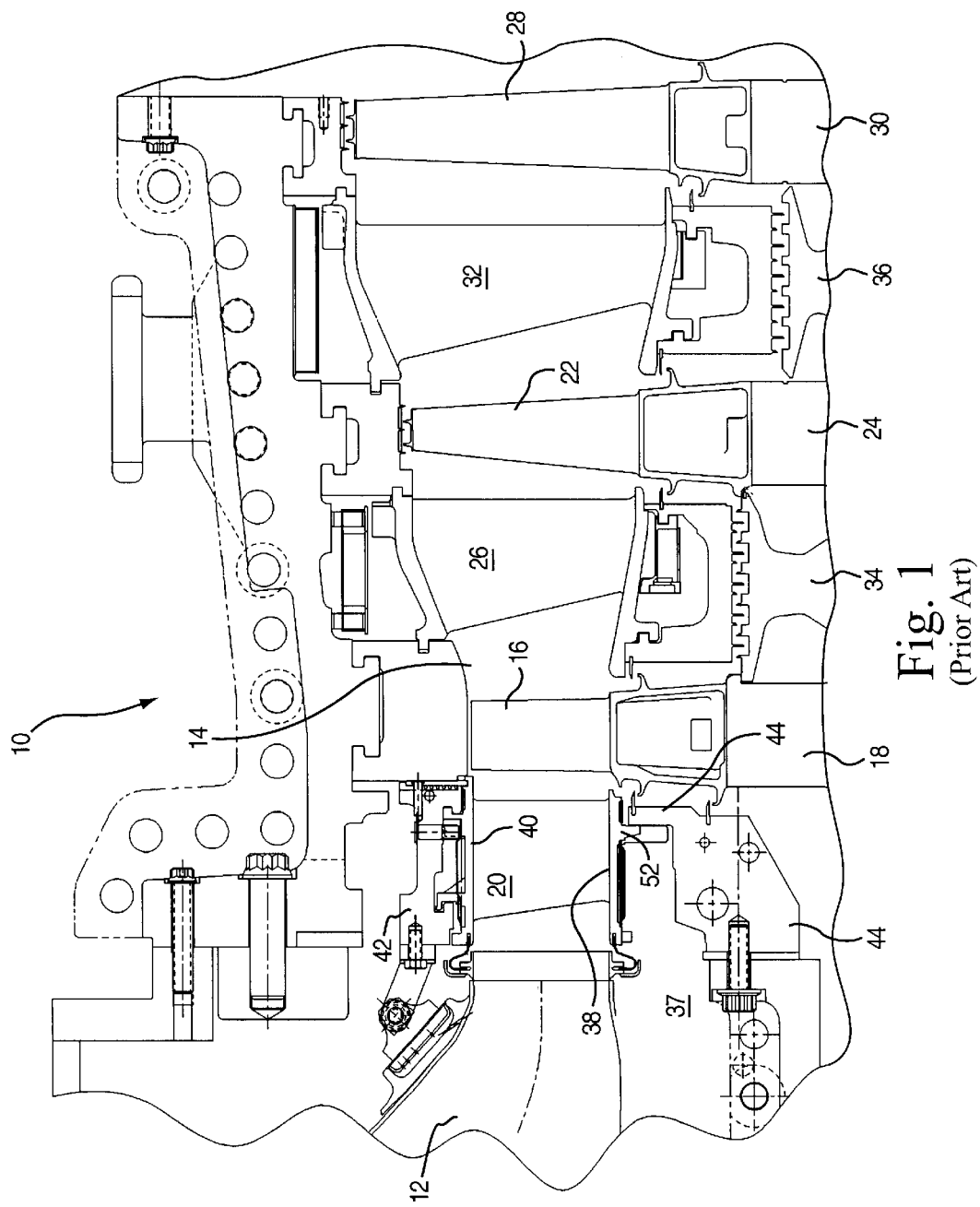
FIG. 1 is a fragmentary schematic side elevational view of a portion of a gas turbine.

Referring now to FIG. 1, there is illustrated a representative example of a turbine section of a gas turbine, generally designated 10. Turbine 10 receives hot gases of combustion from an annular array of combustors, not shown, which transmit the hot gases through a transition piece 12 for flow along an annular hot gas path 14. Turbine stages are disposed along the hot gas path 14. Each stage comprises a plurality of circumferentially spaced buckets mounted on and forming part of the turbine rotor and a plurality of circumferentially spaced stator vanes forming an annular array of nozzles. For example, the first stage includes a plurality of circumferentially-spaced buckets 16 mounted on a first-stage rotor wheel 18 and a plurality of circumferentially-spaced stator vanes 20. Similarly, the second stage includes a plurality of buckets 22 mounted on a rotor wheel 24 and a plurality of circumferentially-spaced stator vanes 26. Additional stages may be provided, for example, a third stage comprised of a plurality of circumferentially-spaced buckets 28 mounted on a third-stage rotor wheel 30 and a plurality of circumferentially-spaced stator vanes 32. It will be appreciated that the stator vanes 20, 26 and 32 are mounted on and fixed to a turbine casing, while the buckets 16, 22 and 28 and wheels 18, 24 and 30 form part of the turbine rotor. Between the rotor wheels are spacers 34 and 36 which also form part of the turbine rotor. It will be appreciated that compressor discharge air is located in a region 37 disposed radially inwardly of the first stage and that such air in region 37 is at a higher pressure than the pressure of the hot gases flowing along the hot gas path 14.

Figure 2:
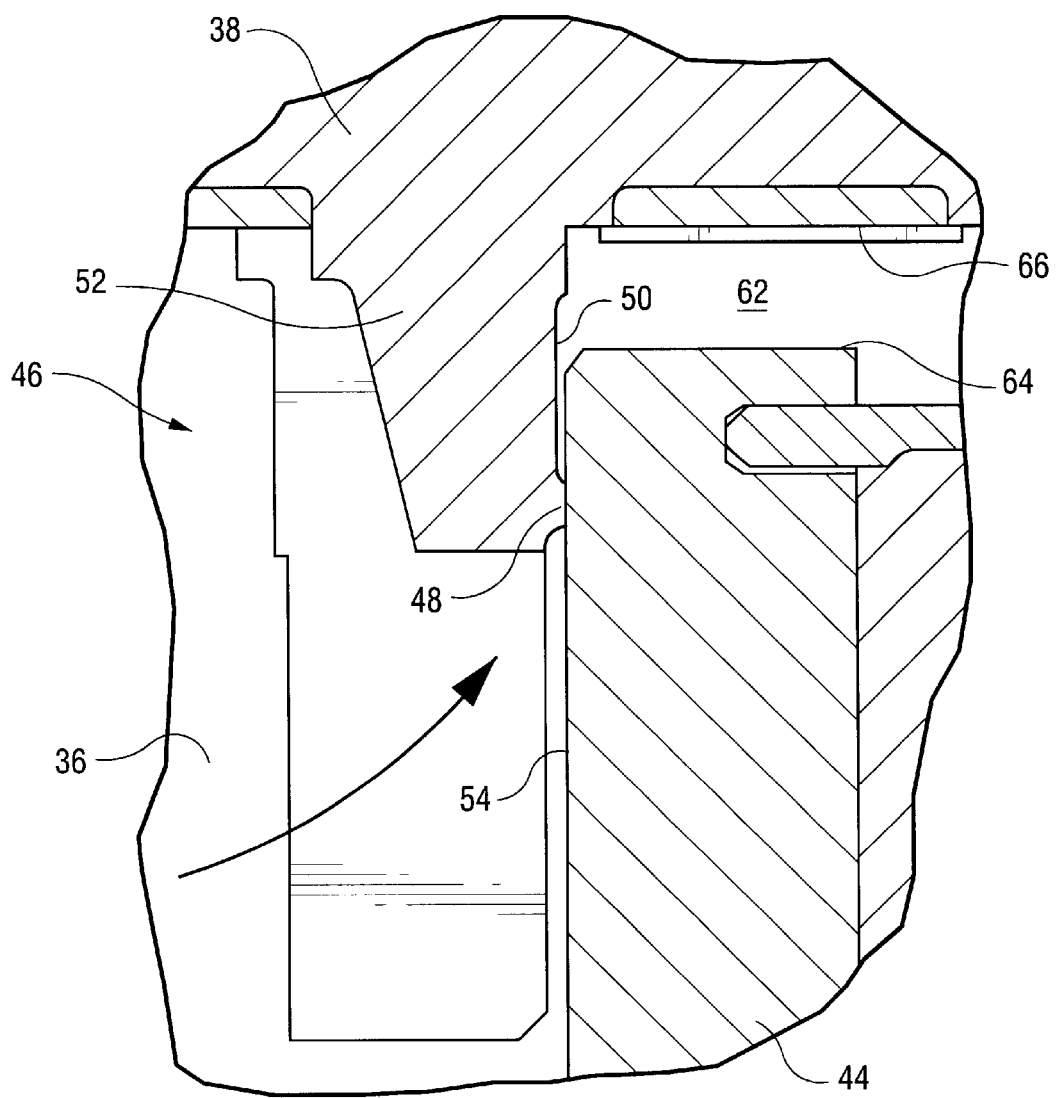
FIG. 2 is an enlarged fragmentary cross-sectional view illustrating a conventional chordal seal hinge.
Figure 3:
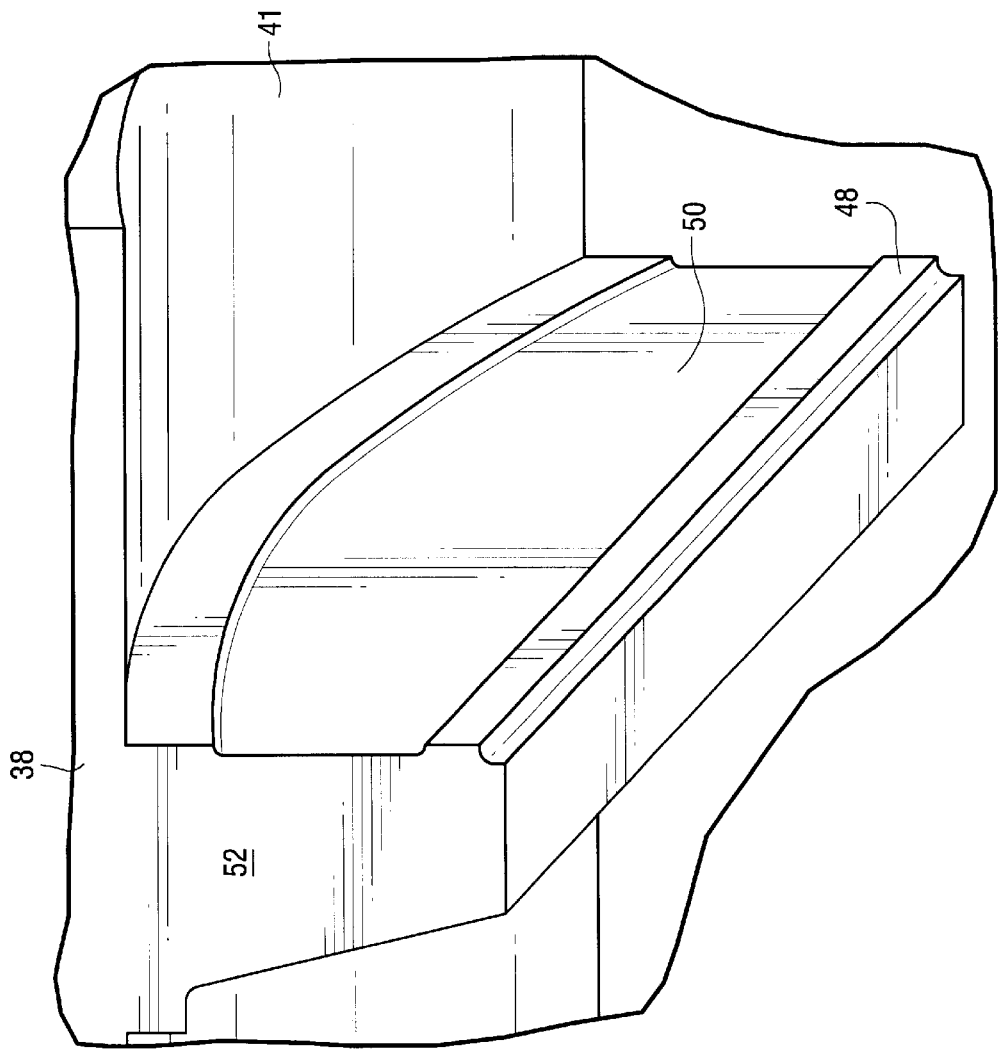
FIG. 3 is a fragmentary perspective view illustrating a portion of a conventional chordal hinge seal along an inner rail of a nozzle segment.
Figure 4:
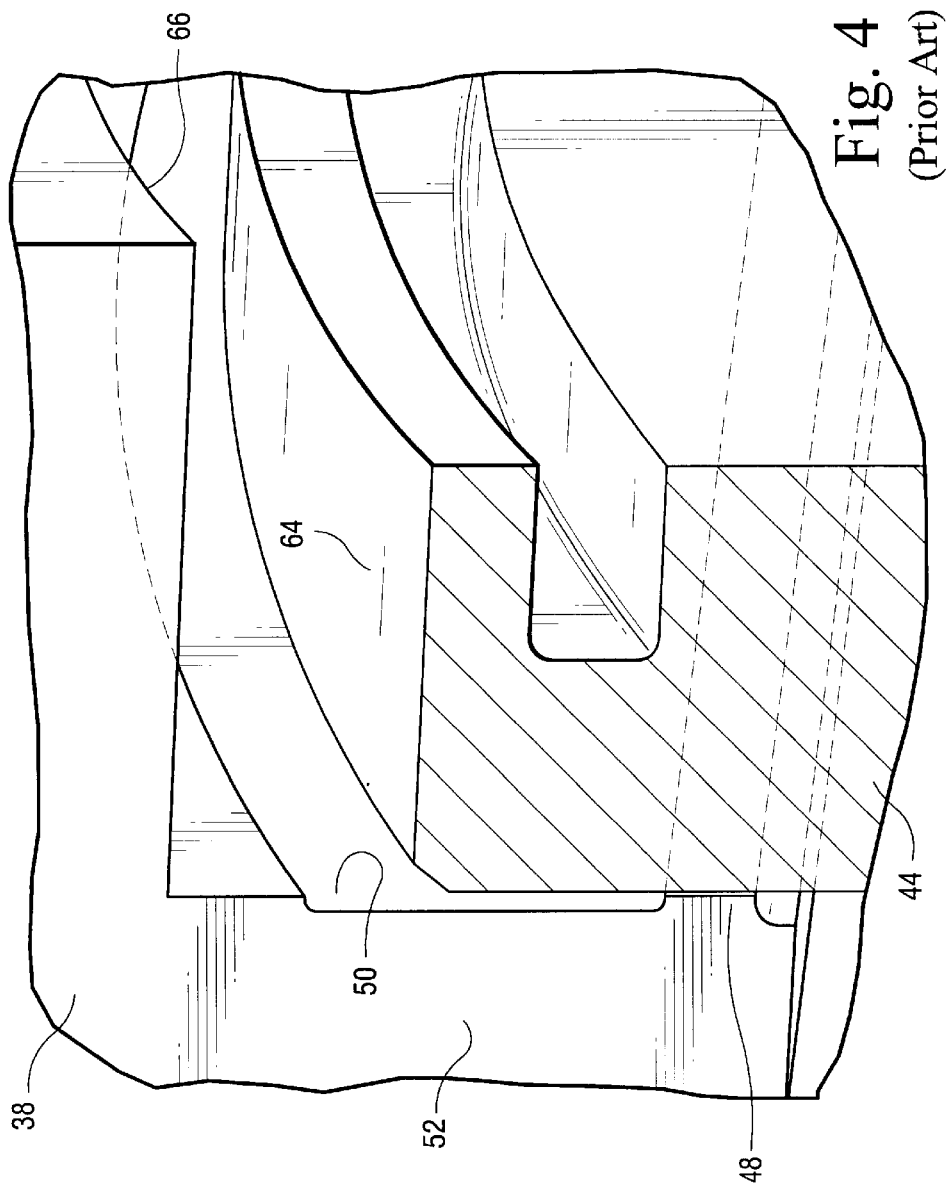
FIG. 4 is a fragmentary perspective view with parts in cross-section illustrating the conventional chordal hinge seal in sealing engagement with a nozzle support ring of the gas turbine.

Referring to the first stage of the turbine, the stator vanes 20 forming the first-stage nozzles are disposed between inner and outer bands 38 and 40, respectively, supported from the turbine casing. As noted above, the nozzles of the first stage are formed of a plurality of nozzle segments 41 (FIG. 3) each mounting one, preferably two, stator vanes extending between inner and outer band portions and arranged in an annular array of segments. A nozzle retaining ring 42 connected to the turbine casing is coupled to the outer band and secures the first-stage nozzle. A nozzle support ring 44 radially inwardly of the inner band 38 of the first-stage nozzles engages the inner band 38. Particularly, the interface between the inner band 38 and the nozzle support ring 44 includes an inner rail 52 (FIG. 2). The inner rail 52 includes a chord-wise, linearly extending axial projection 48, generally and collectively hereinafter referred to as a chordal hinge seal 46. Projection 48 extends along an axial facing surface 50 of the inner rail 52 which forms an integral part of each nozzle segment and specifically the inner band 38. The projection 48 engages a first annular surface 54 of the nozzle support ring 44. It will be appreciated that high pressure compressor discharge air lies in the region 37 and lower pressure hot gases flowing in the hot gas path 14 lie on the opposite side of the seal 48. The chordal hinge seal 46 thus is intended to seal against leakage from the high pressure region 37 into the lower pressure region of the hot gas path 14.

Figure 5:
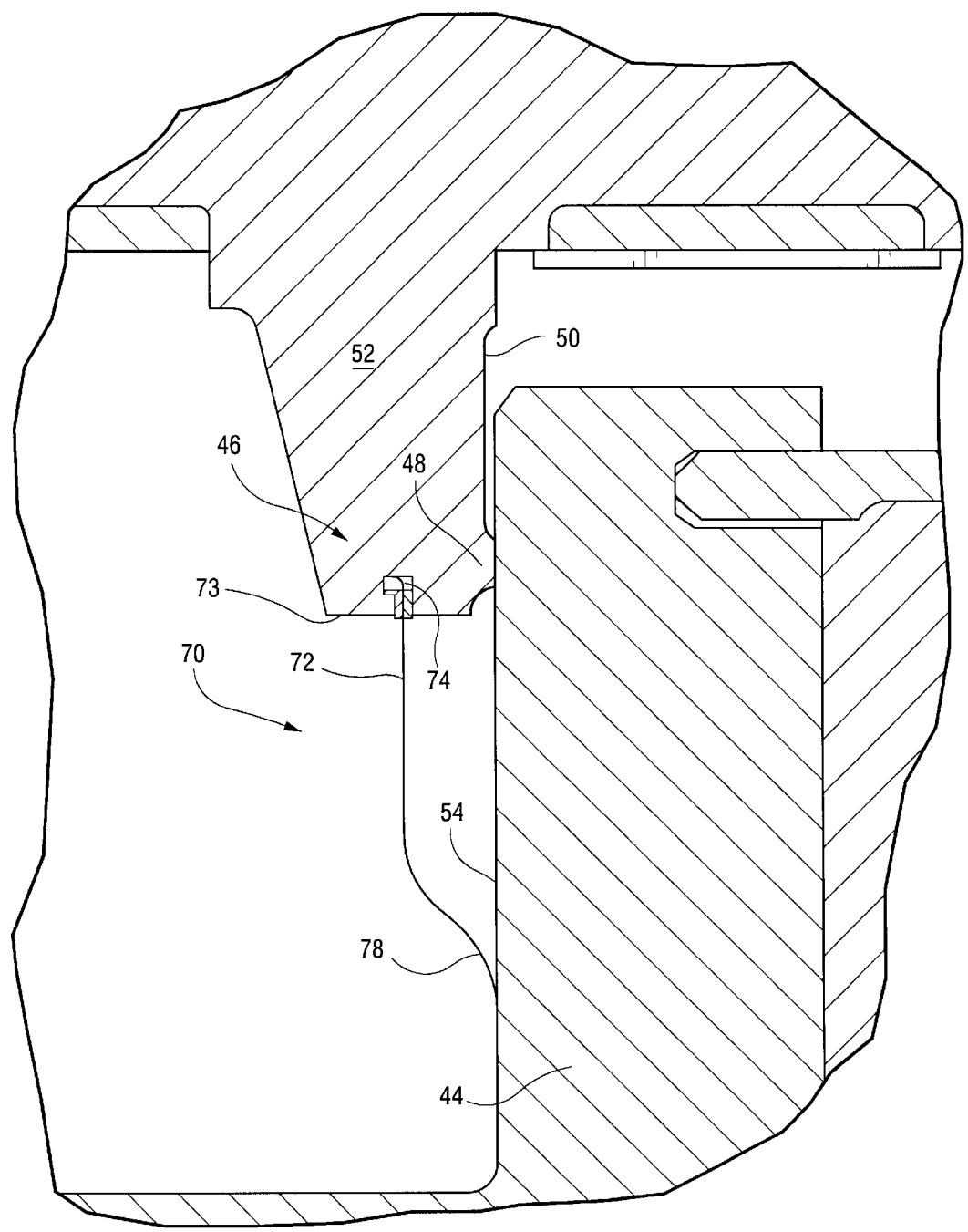
FIG. 5 is an enlarged cross-sectional view illustrating a chordal hinge seal and a supplemental seal in accordance with a preferred embodiment of the present invention.
Figure 6:
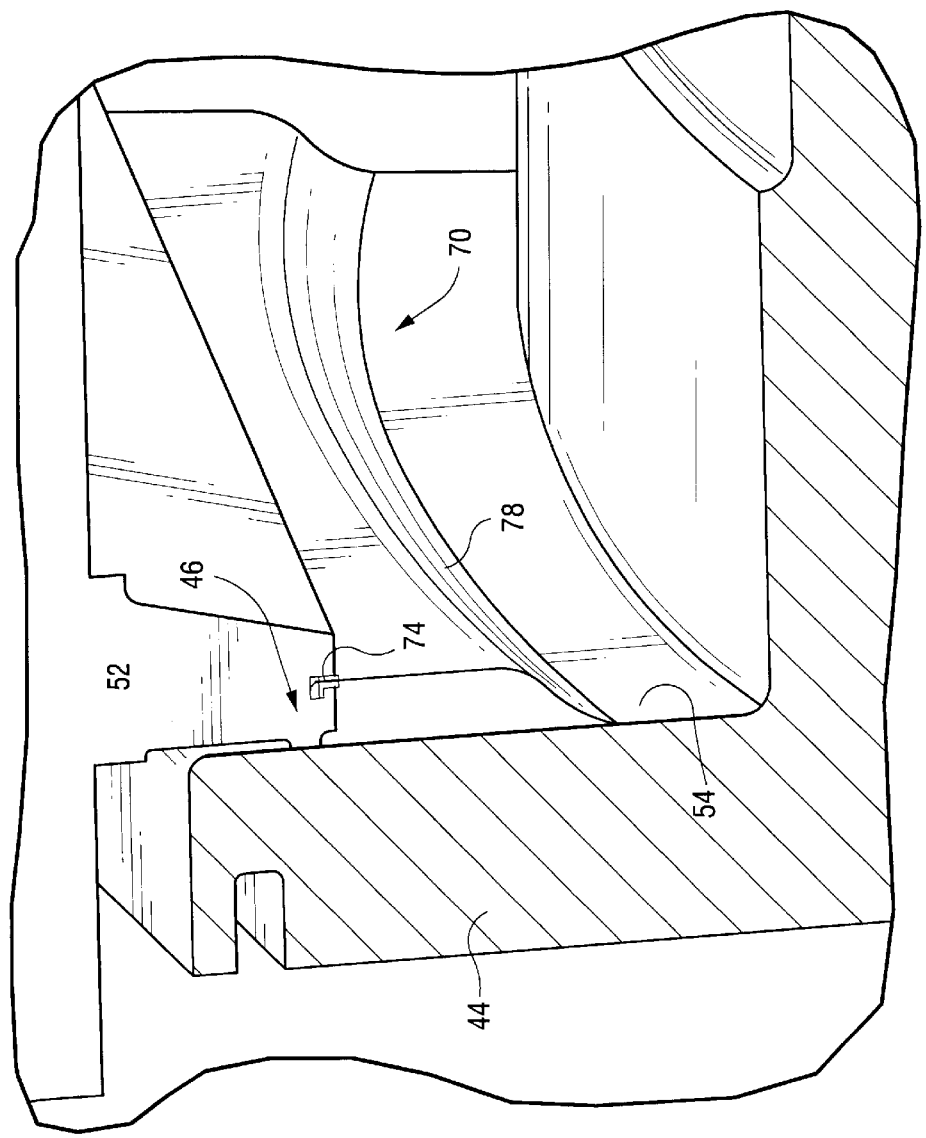
FIG. 6 is a perspective view illustrating the flexible seal between the inner rail of the segment and a sealing surface of the nozzle support ring.
Figure 7:
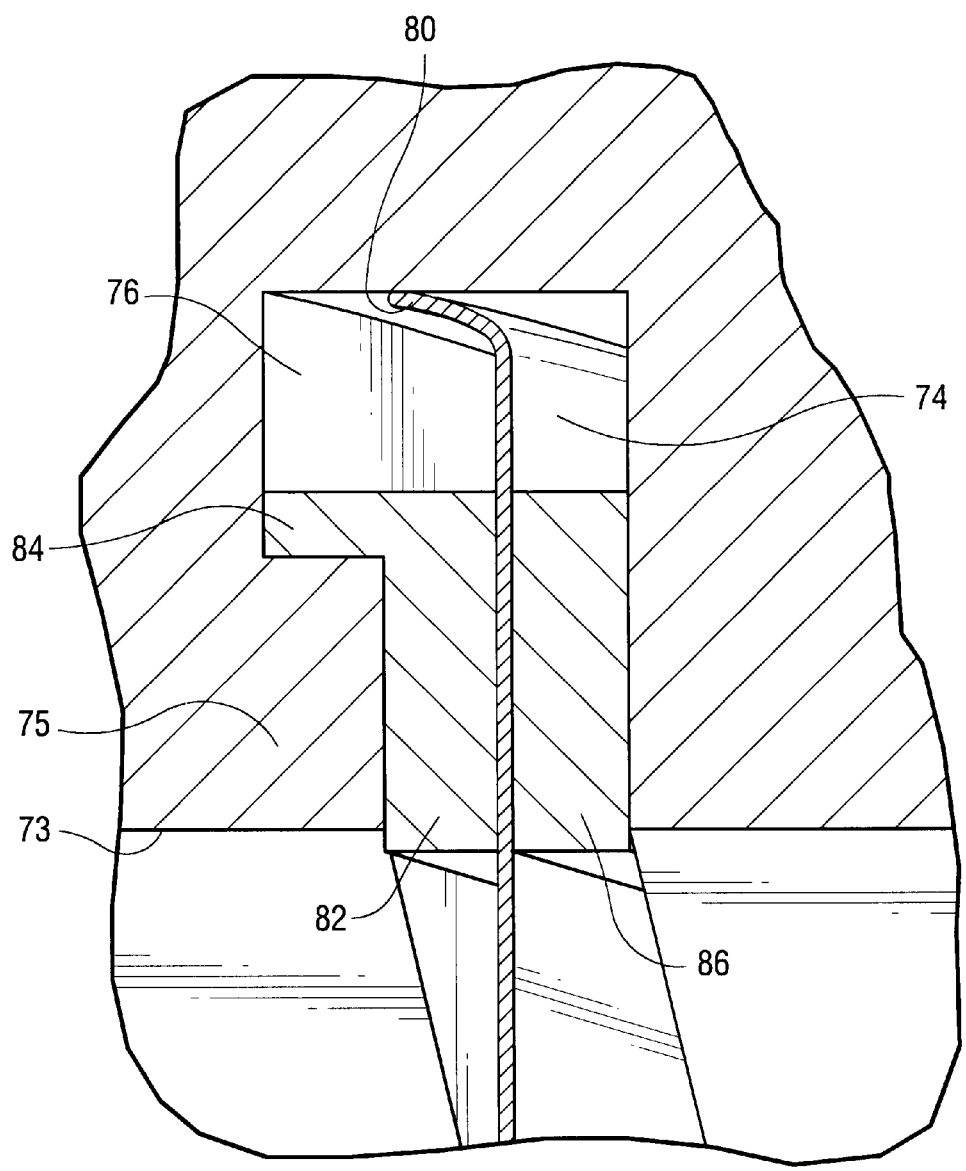
FIG. 7 is an enlarged fragmentary perspective view illustrating the first margin of the supplemental seal in the groove along the inner rail.
Figure 8:
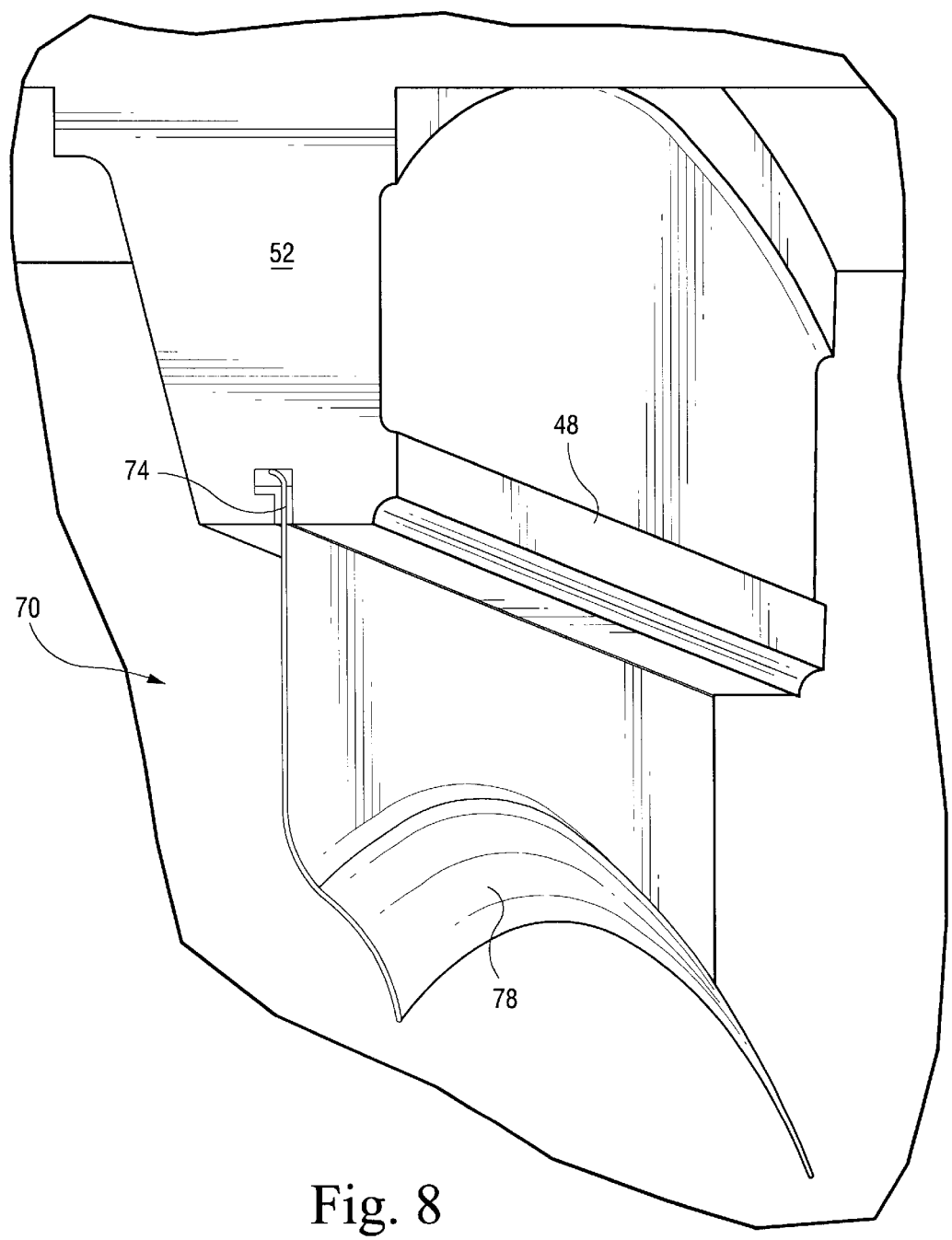
FIG. 8 is a perspective view illustrating the inner rail with the supplemental seal depending therefrom.

As noted previously, however, in operation, component parts of the nozzles and nozzle support ring will tend to form leakage gaps between the projection 48 and the surface 54 of the nozzle support ring 44 whereby leakage flow may occur from the high pressure region to the low pressure region. In order to minimize or prevent leakage flow into the hot gas path 14, and in accordance with a preferred embodiment of the present invention, there is provided a supplemental seal for sealing between the first-stage nozzles and the nozzle support ring 44. The supplemental seal, generally designated 70, includes a seal body 72 preferably formed of sheet metal having a first margin 74 for engaging within a groove 76 (FIG. 7) formed along a radial inner surface 73 of the inner rail 52 of each segment. Seal 70 also includes a second margin 78 along an opposite side thereof for engaging the sealing surface 54 of the nozzle support ring 44. As illustrated in FIG. 5, the supplemental seal 70 lies radially inwardly of the chordal hinge seal 46, including the projection 48, and thus seals between the high pressure region 37 and the downstream region on the opposite side of the seal, including the chordal hinge seal.

The supplemental seal 70 is provided in segments corresponding to the number of nozzle segments. The first margin of the supplemental seal extends in a chord-wise direction for insertion within the linear groove 76 of the inner rail 52. More particularly, the inner margin 74 of supplemental seal 70 includes an edge 80 (FIG. 7) which is bent or folded over to bear against a surface of the groove 76, preferably the base of the groove, to seal against passage of a fluid, e.g., air, from one side of the seal to the opposite side along the groove.

To retain the flexible seal 70 in the groove 76, at least one elongated strip of metal 82 is secured, for example, by welding, along one side of the first margin 74 of the sheet metal seal 70. The elongated strip includes a flange 84 which cooperates with the flange 75 formed in the groove 76 to retain the first margin 74 of the supplemental seal within the groove 76. Preferably, an elongated metal strip 86 is likewise secured along the opposite side of the margin from the first strip 82, thus locating the margin 74 of the flexible sheet metal seal essentially within the linear groove 76.

The opposite or second arcuate margin 78 of the supplemental seal bears against the annular sealing surface 54 of the nozzle support ring 44. The second margin 78 extends arcuately about the axis of the rotor. Additionally, the supplemental seal 70 is preloaded or biased such that the second margin 78 bears against the sealing surface 54 of the nozzle support ring 44. In addition, because the seal 70 is exposed to the high pressure region 37, the sheet metal seal 70 is also biased into engagement with the nozzle support ring due to the pressure difference on opposite sides of the seal 70.

In use, it will be appreciated that the supplemental flexible seal 70 lies radially inboard of the chordal hinge seal 46 and extends between the chord-wise extending, radially innermost surface of the inner rail 52 and the annular sealing surface 54 of the nozzle support ring 44. Thus, any leakage flow past the supplemental seal 70 encounters the chordal hinge seal 46 at a lower pressure. Thus, the pressure difference across the chordal hinge seal is minimized, reducing any leakage flow. Preferably, the supplemental seal 70 is provided for each nozzle segment. The adjacent ends of seals 70 formed on adjacent nozzles may overlap one another, however, providing effective inter-segment supplemental seals at the joint between adjacent segment.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turbine comprising:
    a turbine nozzle support ring having a generally axially facing first surface;
    a turbine nozzle segment having at least one stator vane and including an inner band carrying an inner rail, said inner rail having a second surface in axial opposition to said first surface;
    one of said first and second surfaces including an axially extending projection therealong for engagement with another of said first and second surfaces to form a first seal therebetween sealing between high and low pressure regions on opposite sides of said seal; and
    a flexible supplemental seal extending between said inner rail and said first surface at a location radially inwardly of said first seal and between at least opposite end edges of said segment, a first margin of said flexible seal being secured to said inner rail and a second margin of said flexible seal sealingly engageable with said first surface.

2. A turbine according to claim 1 wherein said second margin of said flexible seal is arcuate in a circumferential direction about an axis of the turbine.

3. A turbine according to claim 2 wherein said first margin extends linearly generally along a chord line of said inner rail.

4. A turbine according to claim 1 wherein said flexible seal comprises sheet metal.

5. A turbine according to claim 1 including a groove formed in said inner rail, said flexible seal being formed of sheet metal and said first margin of said flexible seal including an edge of said sheet metal bent to sealingly engage a surface of said groove.

6. A turbine according to claim 5 wherein said bent sheet metal edge engages a base of said groove.

7. A turbine according to claim 6 wherein said groove and said first margin extend linearly generally along a chord line of the inner rail and said second margin extends arcuately about an axis of the turbine.

8. A turbine according to claim 1 including a groove formed in said inner rail, said flexible seal being formed of sheet metal, an elongated first strip secured to said flexible seal along said first margin thereof and engaging within said groove to retain said flexible seal in said groove.

9. A turbine according to claim 8 including an elongated second strip secured to said flexible seal along an opposite side of said first margin from said first strip and engaging within said groove to retain said flexible seal in said groove.

10. A turbine according to claim 8 wherein said first margin includes an edge of said sheet metal bent to sealingly engage a surface of said groove.

11. A turbine according to claim 10 wherein said bent edge extends into said groove beyond said strips and sealingly engages a base of said groove.

12. A turbine according to claim 1 wherein said flexible seal is preloaded to sealingly engage said first surface.

13. A gas turbine comprising:
    a turbine nozzle support ring having a generally axially facing first surface;
    a plurality of turbine nozzle segments each having at least one stator vane and an inner rail, said inner rails of said segments forming a generally annular second surface in axial opposition to said first surface, each of said inner rails including an axially extending projection along said second surface thereof for engagement with said first surface to form a first seal therebetween sealing between high and low pressure regions on opposite sides of the seal;
    a plurality of flexible supplemental seal segments extending between said inner rails and said first surface at locations radially inwardly of said first seal, each flexible seal segment having a first margin secured to the inner rails of at least two adjoining segments and spanning at least the joint therebetween, a second margin of each said flexible seal segment sealingly engageable with said first surface in response to leakage flow past said first seal.

14. A turbine according to claim 13 wherein said axially extending projection along each of said nozzle segments extends along a chord line of each said segment.

15. A turbine according to claim 13 wherein said first margins of said flexible seal segments form an annulus about an axis of the turbine.

16. A turbine according to claim 13 wherein each of said flexible seal segments comprises sheet metal.

17. A turbine according to claim 13 including a groove formed in said inner rail of each nozzle segment, said flexible seal segments being formed of sheet metal and having said first margins including an edge thereof bent to sealingly engage a surface of each of said grooves.

18. A turbine according to claim 17 wherein said axially extending projection along each of said nozzle segments extends along a chord line of each said segment, said first margins of said flexible seal segments forming an annulus about an axis of the turbine.

19. A turbine according to claim 13 wherein said flexible seal is preloaded to sealingly engage said first surface.

20. A turbine according to claim 19 wherein each of said flexible seal segments comprises sheet metal.

21. A turbine according to claim 13 wherein said axially extending projection along each of said nozzle segments extends along a chord line of each said segment, said first margins of said flexible seal segments forming an annulus about an axis of the turbine.

* * * * *